June 26, 1951  D. C. GERBER  2,558,429
SUCTION CLEANER
Filed Oct. 23, 1946
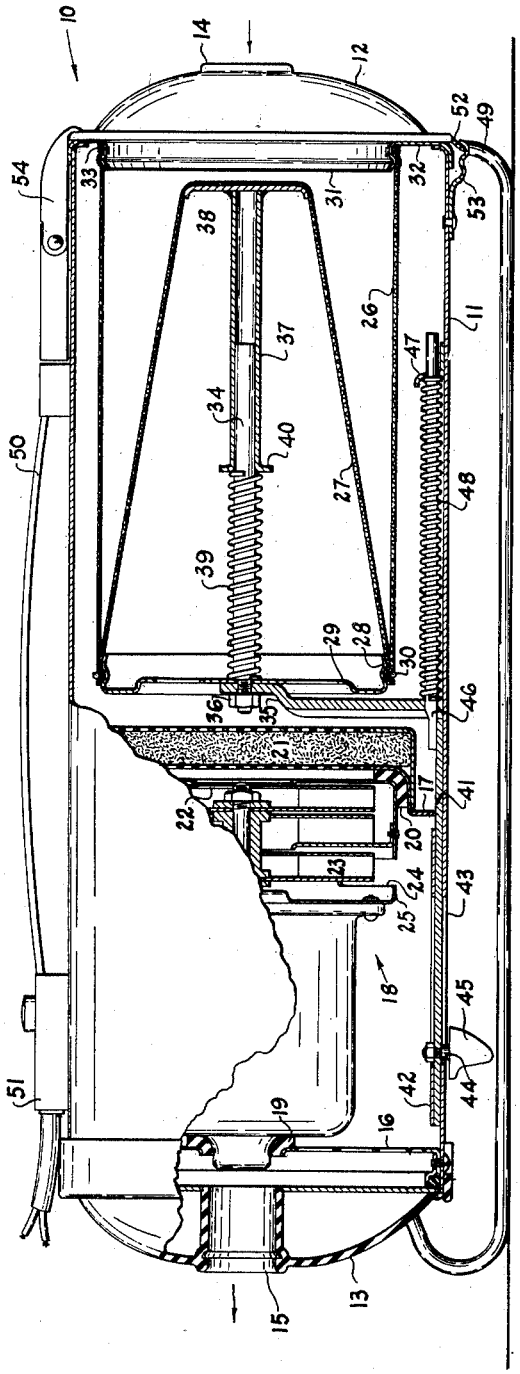
Fig.1
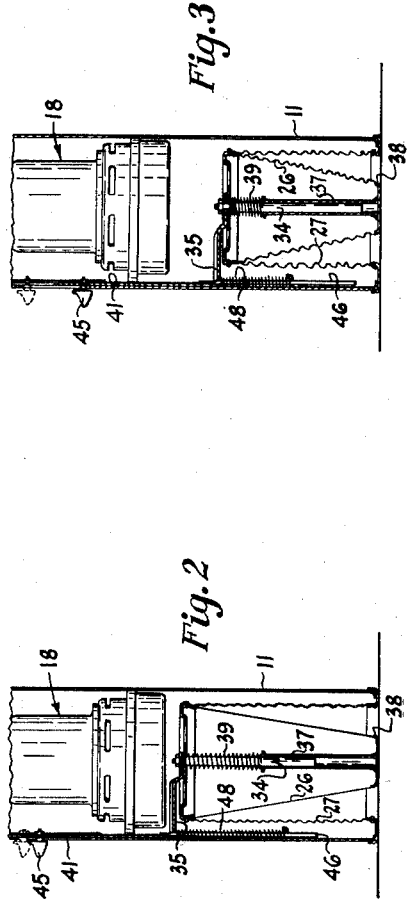
Fig.3
Fig.2
INVENTOR.
Dale C. Gerber
BY Harry S. Stuart
ATTORNEY.

Patented June 26, 1951

2,558,429

UNITED STATES PATENT OFFICE 2,558,429

SUCTION CLEANER

Dale C. Gerber, North Canton, Ohio, assignor to The Hoover Company, North Canton, Ohio, a corporation of Ohio Application October 23, 1946, Serial No. 705,173

5 Claims. (Cl. 183—59)

The present invention relates to suction cleaners in general and more particularly to a new and improved filter construction which can be readily and simply cleaned of foreign material without removal from the suction cleaner. More specifically the invention comprises an encased filter having shaker mechanism associated therewith which can be conveniently operated by the user to agitate vigorously all walls of the filter to dislodge dirt and foreign material therefrom without removal of the filter.

A principal purpose of the present invention is the provision of a new and improved suction cleaner having a self-contained filter shaker mechanism. More specifically, it is an object of the invention to provide a cleaner with a built-in filter and filter shaker which can be energized to clean the filter thoroughly while it remains in situ and in such manner that the dirt contained therein cannot escape into the surrounding atmosphere. Another object is the provision of a novel shaker mechanism for a filter of the re-entrant bag type which is very simple structurally and functionally, and low in cost. A further object of the invention is the provision of a built-in filter and shaker which can be readily operated by the user to dislodge foreign material either between filter emptying operations or during emptying of the filter and while the filter remains housed within the cleaner casing thereby eliminating handling of the filter in any way and avoiding the escape of dust and dirt into the room. More particularly, it is an object of the invention to provide a suction cleaner with a built-in filter which can be simultaneously emptied and shaken vigorously without permitting dust to escape into the surrounding space.

Still another important object is the provision of a novel filter suspension means which places each wall under resilient tension independently of the other walls thereby assuring proper tensioning of all parts of the filter irrespective of variations in the size and relative positioning of parts during manufacture.

These and other objects will become apparent upon reading the following specification and claims and the accompanying drawings showing a preferred embodiment.

Figure 1 is a side view, partially in section, of a tank type suction cleaner incorporating my invention.

Figure 2 is a vertical sectional view showing the cleaner during the filter emptying operation and the position of the shaker mechanism at the time when the re-entrant portion abuts the floor or dirt receiving receptacle.

Figure 3 is a view similar to Figure 2 but showing the shaker mechanism and filter in compressed position.

Referring now to the drawings, a tank type cleaner is generally illustrated in Figure 1 as incorporating my invention though it will be understood that the principle of the invention might be applied to other types of suction cleaners and to devices utilizing filters to separate solid materials from a gaseous medium. A cleaner proper 10 comprises an elongated casing 11 whose opposite ends are closed by end cap members 12 and 13. End cap 12 has an air inlet opening 14 to which may be connected suitable cleaning tools. The other end cap 13 has a similar opening 15 which serves as a clean air outlet.

A motor fan unit of conventional design may be mounted in any suitable manner in one end of the casing as illustrated. A multiple stage motor fan unit 18 has its opposite ends supported in a reticulated partition 16 and an annular supporting member 17. Interposed between the motor fan unit and these supporting members are sponge rubber mountings 19 and 20. A final filter pad 21 is supported over the intake end of the fan and serves to filter out any small particles of dust which may escape from the principal filter to be described below. The first stage of the fan is provided with an air intake 22. The second stage 23 of the fan discharges the air through a series of ports 24 located in fan casing 25.

My novel combined filter and shaker mechanism is shown as occupying the right hand end of the casing. This filter is of the re-entrant type to provide a maximum filter surface in a minimum space and may be formed of any suitable filter material. The filter comprises an outer pervious cylindrical wall 26 and an inner frusto-conical wall 27 suitably secured together at their ends. This may be accomplished by mounting the frusto-conical section on the in-turned lip 28 of the perforated cap member 29. The cylindrical portion of the filter likewise is fitted about the same lip and the two filter walls are held thereto by any desired type of clamping device such as the split spring ring 30. The outer end of the cylindrical filter member may be held in place on the in-turned lip 31 of annulus 32 by a similar split spring ring 33. Annulus 32 has tight frictional engagement with the end of casing member 11 and can be with-drawn therefrom for replacement of the filter should this become necessary.

Cap member 29 for the inner end of the filter supports guide rod 34 which extends axially into the re-entrant portion of the filter. Its inner end is secured to a reciprocating L-shaped bracket 35 by nut 36 which also serves to secure cap member 29 to the bracket.

Tubular member 37 is mounted for reciprocal movement along guide rod 34 and carries a circular plate 38 on its outer end. This plate provides a relatively large area bearing plate for the smaller end of the re-entrant portion of the filter. A coil compression spring 39 is mounted on guide rod 34 and is interposed between cap 29 and the expanded inner end 40 of the tubular member. It will thus be apparent that spring 39 tends to maintain the re-entrant portion 27 of the filter in taut condition at all times regardless of the condition in cylindrical portion 26.

The L-shaped bracket 35 has one arm 41 mounted for reciprocal movement along the inner lower side of casing 11. A slotted metal member 42 straddles arm 41 and is secured to casing 11 to form an operating guide for the bracket. Underlying arm 41 of the bracket is an opening 43 in the casing through which pin 44 projects and carries an operating handle 45 on its outer end.

A guide rod 46 is secured to bracket arm 41 and extends in the opposite direction therefrom. Its outer end is mounted for sliding movement in a bracket 47 secured to casing 11. Compression spring 48 is mounted on rod 46 and is interposed between the L-shaped bracket 35 and a smaller bracket 47. As will be obvious, spring 48 normally maintains bracket 35 in the position shown in Figure 1 and serves to snap the filter to a taut position to dislodge agglomerated dirt after operating handle 45 has been moved toward the filter and released.

The cleaner may be provided with runners 49 to facilitate movement of the cleaner about the room being cleaned. Also a carrying handle 50 and a cleaner control switch 51 are mounted along the top of the casing.

The right hand end cap 12 is readily removable from the cleaner to permit emptying of the filter. As shown, the lower side of the cap is provided with a lip 52 which is received in a suitably positioned groove in strap 53 secured to the under side of the casing. Thus it will be clear that the cap may be secured in place by placing lip 52 in the groove and pivoting the cap upwardly and inwardly against the end of the cleaner in which position it may be secured by a suitable clamping device such as clamp 54.

The operation of the device will be apparent from the structure just described. The operator connects the usual cleaning hose and tools to inlet 14 in cap member 12. The suction produced by motor fan unit 18 will cause air to flow through the hose through opening 14 to the main filter chamber where the dust will be separated and the clean air will pass through both the cylindrical wall 26 and the re-entrant wall 27 of the filter. This air will then be drawn through final filter pad 21, pass into inlet 22 of the fan and emerge from the final stage through ports 24. After passing through the openings in partition member 16 the clean air will discharge from the cleaner through exhaust outlet 15 in cap member 13.

After a quantity of dirt has collected in the filter and it is desired to empty the same, it is merely necessary for the operator to remove cap member 12 and up-end the cleaner onto a sheet of paper on the floor or into any suitable dirt receptacle as indicated in Figure 2. The operator then pushes filter shaker handle 45 downwardly to the position shown in Figure 3. This may be done either with his hand or his foot. Downward movement of the handle carries the entire assembly downward until disc 38 on the outer end of tube 37 comes to rest against the floor. The position of parts at this time is shown in Figure 2 and it is to be noted that outer filter wall 26 is wrinkled moderately but that the re-entrant portion 27 is still held in taut condition by spring 39.

Further downward movement of the operating handle 45 to the position shown in Figure 3 will cause further wrinkling of the outer filter wall and a marked wrinkling of all portions of the frusto-conical section. It will also be obvious that springs 39 and 48 are under very considerable tension. Immediately upon release of handle 45 by the operator, springs 39 and 48 will return the parts to the position shown in Figure 1 with a vigorous snapping action causing dirt agglomerated thereon to be ejected and placing both the inner and outer walls of the filter under tension.

Since the end of the cleaner will be held tightly against the receiving receptacle by its own weight and since the filter remains firmly sealed in place in the casing throughout the operation, it will be clear that no dirt can escape into the room. Manifestly the filter may be shaken more than once if this is considered necessary in order to assure the most thorough cleansing of the filter although I have found that a single operation of the shaker is quite sufficient.

After the shaker has been operated to dislodge the dirt from the filter, it is a simple matter to restore the cleaner to full operation, it only being necessary to tip it back onto runners 49, replace cap member 12 and latch it in position by toggle clamp 54.

It will be understood that while the shaker mechanism is normally operated only when emptying the dirt from the filter, it is also susceptible to operation at any time. Thus, if the user wishes to improve the operating efficiency of the filter without removing the dirt, he may do so by up-ending the cleaner onto the end closure cap. The shaker handle is operated as described above and the outer end of the re-entrant portion is brought to rest against the inner side of the closure after which further movement of the operating handle serves to collapse the re-entrant portion as described above. Release of the handle permits springs 39 and 48 to snap the inner end of the bag to its normal position with both the inner and outer walls under tension.

If desired, the length of the re-entrant portion may be shortened or its smaller end may be made much smaller to increase the dirt capacity of the filter. In this event an axially extending projection may be secured to the outer side of the disc 38. Such a projection should terminate so as to be housed within the filter chamber when the same is under tension. During operation of the shaker the projection would abut the floor or the closure and operate to collapse the re-entrant section as will be readily understood.

While I have shown but a single embodiment of my invention, it is to be understood that this embodiment is to be taken as illustrative only and not in a limiting sense. I do not wish to be limited to the specific construction shown and described but to include all equivalent variations thereof except as limited by the scope of the claims.

Having thus described my invention what I claim is:

1. The combination with a suction cleaner having an open end casing, of a filter bag therein having a closed bottom formed by a re-entrant part of said filter and an open end secured to the open end of said casing, said re-entrant part terminating adjacent but short of the open end of said casing, filter shaking mechanism for said filter comprising manually operable means supported by said casing and attached to the bottom of said filter, spring means normally biasing said manually operable means in a direction to tension the outer walls of said filter, spring biased means interposed between the opposite ends of said re-entrant part for normally holding the walls thereof taut independently and irrespective of the tensioned condition of the outer walls of said filter, said spring biased means for said re-entrant part being attached to and movable with said manually operable means for said filter shaking mechanism, said manually operable means being movable in opposition to the spring means acting thereon to collapse the outer walls of said filter whereby upon the release of said manually operable means said spring means tensions said outer walls abruptly to dislodge dirt therefrom.

2. A suction cleaner as defined in claim 1 including a closure member for the open end of said casing, said manually operable means of said shaker mechanism being manually movable to depress the outer end of said re-entrant filter against said closure in opposition to said spring biased means for said re-entrant part whereby both the walls of said re-entrant part and said outer filter walls are collapsed.

3. A suction cleaner as defined in claim 2 wherein the outer end of said re-entrant part is normally spaced inwardly of said closure member whereby the actuation of said manually operable means to shake said filter acts to partially collapse the outer walls of said filter before relaxing the tension on the walls of said re-entrant part.

4. A suction cleaner as defined in claim 1 in which said shaker mechanism is adapted to be operated when said cleaner casing is supported by its open end on a floor, and wherein actuation of said manually operable means moves the closed bottom end of said filter downwardly toward the floor in opposition to the spring means acting to tension the outer walls of said filter to relax the tension thereon and thereafter brings the outer end of said re-entrant part into contact with the floor to relax the tension on the walls of said re-entrant part of the filter.

5. A suction cleaner as defined in claim 4 wherein the release of said manually operable means permits the spring means acting thereon and the spring biased means acting on said re-entrant part to abruptly tension the walls of said re-entrant part and thereafter to tension the outer walls of said filter to dislodge dirt therefrom.

DALE C. GERBER.

REFERENCES CITED

The following references are of record in the file of this patent:

UNITED STATES PATENTS

| Number | Name | Date |
|---|---|---|
| 971,013 | Smith | Sept. 20, 1910 |
| 1,856,133 | McClatchie | May 3, 1932 |
| 2,091,137 | Carson | Aug. 24, 1937 |
| 2,192,357 | Leathers | Mar. 5, 1940 |
| 2,304,309 | Leathers | Dec. 8, 1942 |

FOREIGN PATENTS

| Number | Country | Date |
|---|---|---|
| 868,555 | France | Oct. 6, 1932 |
| 257,096 | Germany | Feb. 27, 1913 |
| 654,807 | Germany | Dec. 30, 1937 |